(12) United States Patent
Dobbin

(10) Patent No.: US 9,228,604 B2
(45) Date of Patent: Jan. 5, 2016

(54) CAP FOR FORMING SEALED CAVITY AROUND FASTENER

(75) Inventor: Richard Dobbin, Chepstow (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 328 days.

(21) Appl. No.: 13/984,389

(22) PCT Filed: Feb. 3, 2012

(86) PCT No.: PCT/GB2012/050228
§ 371 (c)(1),
(2), (4) Date: Aug. 8, 2013

(87) PCT Pub. No.: WO2012/107741
PCT Pub. Date: Aug. 16, 2012

(65) Prior Publication Data
US 2013/0322982 A1    Dec. 5, 2013

Related U.S. Application Data

(60) Provisional application No. 61/441,380, filed on Feb. 10, 2011.

(30) Foreign Application Priority Data

Feb. 10, 2011 (GB) .................................. 1102348.8
May 26, 2011 (GB) .................................. 1108900.0

(51) Int. Cl.
*F16B 39/02* (2006.01)
*F16B 33/00* (2006.01)
(Continued)

(52) U.S. Cl.
CPC .............. *F16B 33/004* (2013.01); *B64D 45/02* (2013.01); *F16B 37/14* (2013.01); *Y10T 29/49948* (2015.01)

(58) Field of Classification Search
CPC ...... F16B 13/141; F16B 33/004; F16B 37/14; F16B 39/02
USPC ............ 411/82, 82.3, 103, 172, 372.5–372.6, 411/373
See application file for complete search history.

(56) References Cited

U.S. PATENT DOCUMENTS 3,557,654 A    1/1971   Weidner
4,582,462 A *  4/1986   Thiel .......................... 411/372.5
(Continued)

FOREIGN PATENT DOCUMENTS

DE    102005030817 A1    1/2007
EP         0153487 A1     9/1985
(Continued)

OTHER PUBLICATIONS

Search Report for Application No. GB1102348.8, dated Apr. 13, 2011.
(Continued)

*Primary Examiner* — Roberta Delisle
(74) *Attorney, Agent, or Firm* — Hauptman Ham, LLP

(57) ABSTRACT

A joint comprising: a structure; and a fastener passing through the structure. The cap has a body portion with an annular base terminating at an edge, the body portion forming an enclosure around an end of the fastener. The cap also has an annular flange which extends outwardly from the body portion and is set back from the edge of the base so as to define a pocket between the flange and the base. A sealant is provided in the pocket between the flange and the base, the sealant bonding the cap to the structure via a sealant/cap interface with the cap and a sealant/structure interface with the structure. The surface area of the sealant/cap interface is greater than the surface area of the sealant/structure interface.

13 Claims, 7 Drawing Sheets

(51) Int. Cl.
*B64D 45/02* (2006.01)
*F16B 37/14* (2006.01)

(56) References Cited

U.S. PATENT DOCUMENTS

| | | | |
|---|---|---|---|
| 4,749,321 A * | 6/1988 | Knohl et al. | 411/371.1 |
| 4,826,380 A | 5/1989 | Henry | |
| 4,905,931 A | 3/1990 | Covey | |
| 5,175,665 A | 12/1992 | Pegg | |
| 6,086,972 A * | 7/2000 | Rayburn et al. | 428/40.1 |
| 6,537,006 B1 * | 3/2003 | Clark | 411/82 |
| 7,438,974 B2 | 10/2008 | Obuhowich | |
| 8,717,736 B2 * | 5/2014 | Asahara et al. | 361/218 |
| 8,894,338 B2 * | 11/2014 | Dobbin et al. | 411/373 |
| 2009/0126973 A1 | 5/2009 | Martin Hernandez | |
| 2010/0251661 A1 | 10/2010 | Illgner et al. | |
| 2012/0074257 A1 | 3/2012 | Bessho et al. | |
| 2012/0219380 A1 | 8/2012 | Hutter | |
| 2014/0048198 A1 * | 2/2014 | Dobbin et al. | 156/91 |
| 2014/0234050 A1 * | 8/2014 | Asahara et al. | 411/371.1 |

FOREIGN PATENT DOCUMENTS

| | | |
|---|---|---|
| EP | 0 334 011 A1 | 9/1989 |
| EP | 0334011 A1 | 9/1989 |
| EP | 1 484 245 A1 | 12/2004 |
| GB | 2163817 A | 3/1986 |
| GB | 2226801 A | 7/1990 |
| WO | 2008149386 A1 | 12/2008 |
| WO | 2009063060 A1 | 5/2009 |
| WO | 2010113523 A1 | 10/2010 |
| WO | 2012/118855 A2 | 9/2012 |

OTHER PUBLICATIONS

International Search Report and Written Opinion corresponding to PCT/GB2012/050228, dated Jun. 28, 2012.

* cited by examiner

CAP FOR FORMING SEALED CAVITY AROUND FASTENER

RELATED APPLICATIONS

The present application is a National Phase of International Application Number PCT/GB2012/050228, filed Feb. 3, 2012, and claims priority from British Application Number 1102348.8, filed Feb. 10, 2011, from U.S. Application No. 61/441,380, filed Feb. 10, 2011, and from British Application Number 1108900.0, filed May 26, 2011.

FIELD OF THE INVENTION

The present invention relates to a cap for forming a sealed cavity around one end of a fastener, a method of installing such a cap, and a joint comprising such a cap.

BACKGROUND OF THE INVENTION

FIG. 1 is a side view of part of a fastener assembly passing through a composite panel 1. The assembly comprises an externally threaded bolt 2, an internally threaded nut 3, and a washer 4. In the event of a lightning strike hitting the composite panel 1 and attaching to the fastener, sparking, plasma or out-gassing may occur at the locations 5 shown in FIG. 1.

A known method of providing spark suppression is described in EP-A-0334011. A volume of gas is enclosed by a cap around the fastener. The gas provides spark suppression for arcing that may occur between the composite structure and the metal fastener during any lightning strike.

SUMMARY OF THE INVENTION

A first aspect of the invention provides a joint comprising: a structure; a fastener passing through the structure; a cap comprising a body portion with an annular base terminating at an edge, the body portion forming an enclosure around an end of the fastener, and an annular flange which extends outwardly from the body portion and is set back from the edge of the base so as to define a pocket between the flange and the base; and a sealant in the pocket between the flange and the base, the sealant bonding the cap to the structure via a sealant/cap interface with the cap and a sealant/structure interface with the structure, wherein the surface area of the sealant/cap interface is greater than the surface area of the sealant/structure interface.

It has been found that such a structure is susceptible to failure at the sealant/cap interface, so by increasing the surface area of the sealant/cap interface the strength of the bond is increased. On the other hand, minimising the surface area of the sealant/structure interface reduces the footprint of the cap, thus enabling it to be placed closer to raised features on the structure.

The sealant material performs two functions: firstly it bonds the cap to the structure, and secondly it forms a seal between the cap and the structure so as to prevent gas from escaping the enclosure and/or prevent the ingress of a liquid (such as fuel) into the enclosure. Typically the sealant material is cured in-situ to bond the cap to the structure.

The sealant material may be a material such as a two-part epoxy which is normally used in applications where its primary (or sole) purpose is to act as an adhesive. Alternatively the sealant material may be a material such as polysulphide or silicone rubber which is normally used in applications where its primary (or sole) purpose is to act as a sealant. In the latter case the sealant material is typically an elastomer.

The ratio between the surface area of the sealant/cap interface and the surface area of the sealant/structure interface is typically greater than 150%, and preferably greater than 200%.

The body portion and flange may be formed integrally as a single piece of material, for instance by moulding or additive layer manufacturing. However this single piece arrangement suffers from problems during installation: firstly it may be difficult to completely fill the pocket with sealant; and secondly the sealant may flow from the pocket into the enclosure as is it is pushed onto the structure. The presence of sealant within the central cavity will reduce the effective volume of the cavity and hence impede the performance of the cap. Therefore more preferably the body portion comprises an inner cap member; and the annular flange is a base of an outer cap member which fits over the inner cap member. An adhesive layer may be provided, bonding the outer cap member to the inner cap member.

Preferably at least part of the annular flange extends at an angle of less than 90° to the base so as to define a pocket between the flange and the base. The angle of the flange enables it to have a relatively small footprint, compared to a flange which extends at 90° to the base. The angle of the flange also increases the surface area of the interface between the sealant material and the cap, compared to a flange with an equivalent footprint which extends at 90° to the base.

The flange may have two parts—a proximal part which extends outwardly at 90° to the base, and a distal part which meets the proximal part at a corner and extends at 0° to the base (i.e. parallel to the base). However more preferably at least part of the annular flange extends at an acute angle to the base, wherein the acute angle is less than 90° but greater than 0°.

The annular flange may have an edge which lies in the same plane as the opening, but this may interfere with surface features on the structure near the cap. Therefore more preferably the edge of the flange is set back from a plane defined by the edge of the base, wherein the edge of the base may engage the structure.

A further aspect of the invention provides a cap for forming a sealed cavity around one end of a fastener, the cap comprising an inner cap member with an annular base terminating at an edge which surrounds an opening into a central cavity; an outer cap member which fits over the inner cap member and has an annular base which forms an annular flange extending outwardly from the inner cap member at a point which is set back from the edge of the annular base of the inner cap member so as to define a pocket between the flange and the base; and a sealant material between the inner cap member and the outer cap member.

A further aspect of the invention provides a joint comprising: a structure; a fastener passing through the structure; a cap comprising: an inner cap member with an annular base terminating at an edge which surrounds an opening into a central cavity, the inner cap member forming an enclosure around an end of the fastener, and an outer cap member which fits over the inner cap member and has an annular base which forms an annular flange extending outwardly from the inner cap member at a point which is set back from the edge of the annular base of the inner cap member so as to define a pocket between the flange and the base; and a sealant in the pocket between the flange and the base, the sealant bonding the cap to the structure via a sealant/cap interface with the cap and a sealant/structure interface with the structure.

A further aspect of the invention provides a kit of parts comprising an inner cap member with an annular base terminating at an edge which surrounds an opening into a central cavity; an outer cap member which is sized to fit over the inner cap member and shaped to form an annular flange which extends outwardly from the inner cap member at a point which is set back from the edge of the base when the outer cap member is fit over the inner cap member; and a sealant material contained within the outer cap member.

A further aspect of the invention provides a method of installing a cap to form a sealed cavity around one end of a fastener, the fastener passing through a structure, the cap comprising an inner cap member with an annular base terminating at an edge which surrounds an opening into a central cavity, an outer cap member which fits over the inner cap member and has an annular base which forms an annular flange extending outwardly from the inner cap member at a point which is set back from the edge of the annular base of the inner cap member so as to define a pocket between the flange and the base of the inner cap member, and a sealant material between the inner cap member and the outer cap member, the method comprising: fitting the inner cap member over the one end of the fastener so that it is enclosed by the inner cap member; pushing the outer cap member towards the inner cap member so the sealant material flows into the pocket; and adhering the cap to the structure with the sealant material which flowed into the pocket.

The sealant material in the pocket performs two functions in the further aspects of the invention. Firstly it bonds the cap to the structure, and secondly it forms a seal between the cap and the structure so as to prevent gas from escaping the central cavity. The sealant material may be a material such as a two-part epoxy which is normally used in applications where its primary (or sole) purpose is to act as an adhesive. Alternatively the sealant material may be a material such as polysulphide or silicone rubber which is normally used in applications where its primary (or sole) purpose is to act as a sealant. In the latter case the sealant material is typically an elastomer.

Optionally the joint may further comprise an adhesive layer which is located outside the pocket and bonds the outer cap member to the inner cap member. This adhesive layer may be distinct from the sealant in the pocket between the flange and the base, for instance being formed from a different material. However more preferably the adhesive layer is contiguous with the sealant in the pocket and formed from the same material as the sealant in the pocket.

The cap of all of the above aspects of the invention may be provided for the purpose of spark containment. In this case at least part of the structure through which the fastener passes typically comprises a composite material, and the fastener is electrically conductive. The structure may comprise a pure composite material, or a hybrid composite/metal material. Typically the composite material is a laminar fibre-reinforced composite material, where the fibres are a conductive material such as carbon, and the matrix between the fibres has low conductivity. Alternatively the cap may be used to seal the end of a fastener to prevent the ingress of a liquid (such as fuel). In this case the structure may not contain any composite material.

The structure typically comprises a pair of structural parts (for instance panels) which are joined together by the fastener.

The fastener may comprise a shaft with a head at one end; and a collar fitted to a second end of the shaft (the collar may for instance be a nut which is screwed onto the shaft, or a collar which is swaged onto the shaft). The cap may be used to form a sealed cavity at either the first or second end of such a fastener. The end of the fastener may be housed within the central cavity, or it may be countersunk within the structure (in which case the end of the fastener will lie outside the central cavity).

The fastener may comprise a shaft; a collar attached to the shaft; and a washer between the collar and the structure, wherein the washer and collar have spherical surfaces which engage each other, and wherein the cap engages the washer but not the collar. This enables the shaft to pass through the structure at an oblique angle. Typically the washer is received within the central cavity as an interference fit.

The cap may have a shaft which extends from the inner cap member through the outer cap member. This enables the outer cap to be centred relative to the inner cap. The shaft may have one or more flanges for engaging the outer cap member to lock it in position relative to the inner cap member. This enables the cap to be installed in an inverted configuration.

In a preferred embodiment the outer cap member has two or more vanes which extend from the inner surface of the outer cap member towards the inner cap member. Most preferably there are three or more vanes. Typically the vanes are angled—in other words the outer cap member defines a cap axis which passes through the centre of the opening and the vanes are angled so that they do not extend radially towards the cap axis. Typically each vane is angled so that it extends at an angle of 30°-60° to a radial line between the cap axis and the base of the vane.

Preferably the inner and outer cap have a curved domed shape. This reduces exposure to damage (for instance by being kicked by the foot of an installer), minimises stress concentration, and assists in the flow of sealant into the pocket.

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
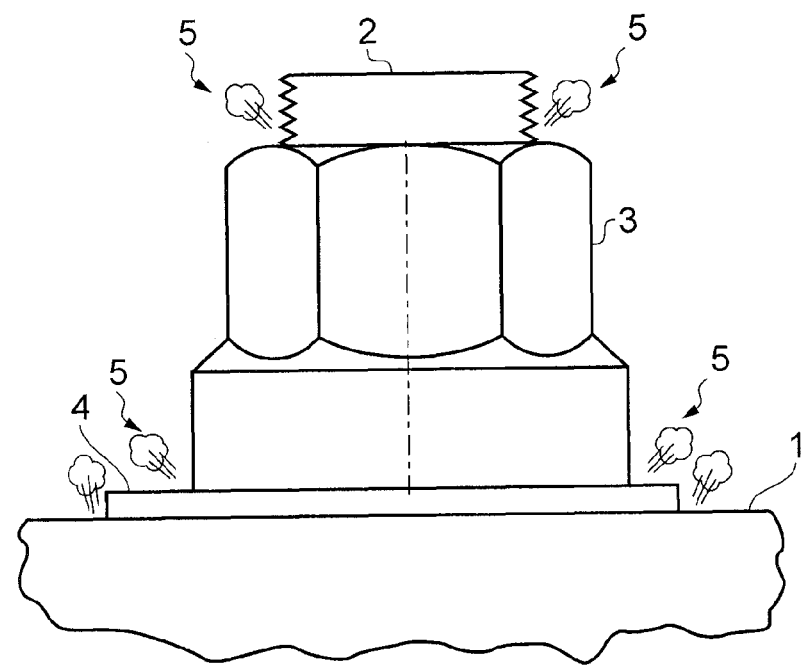
FIG. 1 is a side view of a nut and bolt assembly.
Figure 2:
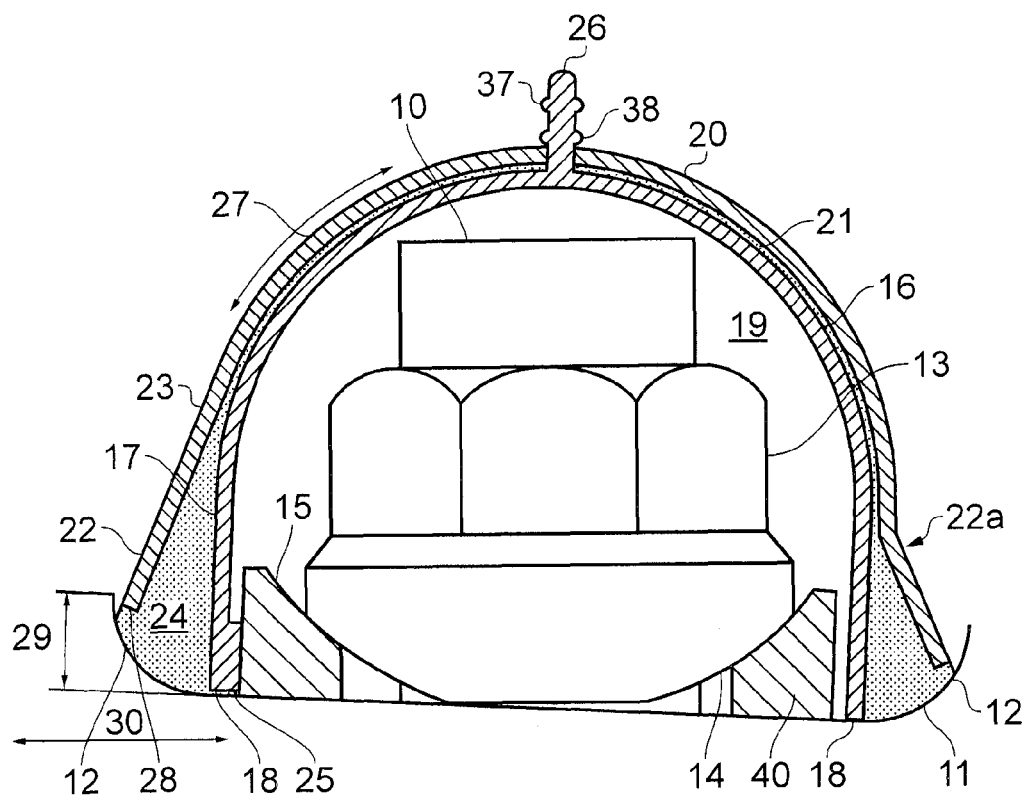
FIG. 2 is a sectional view of a fastener assembly and spark containment cap according to a first embodiment of the invention.

FIG. 2 is a cross-sectional side view showing a metal bolt 10 passing through a composite panel 11 at an angle of 3° to the plane of the panel 11. The panel has raised features 12 on both sides, which may be for example fillets, ribs or spar caps. An internally threaded metal nut 13 is screwed onto the bolt 10 and has a convex spherical surface 14 which engages a concave spherical surface 15 of a washer 40. The spherical nut and washer enable the fastener to be securely fixed to the panel even though the bolt is not perpendicular to the panel.

A spark containment cap is fitted over the fastener. The cap has a two-part construction with an outer cap 20 fit onto an inner cap 16 so that the inner cap 16 is nested within the outer cap 20. The caps 16, 20 have a domed shaped as indicated at 27 which reduces exposure to damage (for instance by being kicked by the foot of an installer) and minimises stress concentration. The caps 16, 20 are formed from a polymer such as polyetherimide ULTEM 2400.

The inner cap 16 has a cylindrical annular base (or skirt) 17 terminating at an edge 18 which surrounds an opening into a central cavity 19 which contains the nut 13, bolt 10 and washer 40. The upper part of the outer cap 20 has a domed shape and is bonded to the inner cap 16 by a thin polysulphide interfay adhesive layer 21. The interfay adhesive layer 21 between the inner and outer caps creates a bonded double layer with enhanced flexibility and strength.

The lower part of the outer cap 20 has a flared base (or skirt) 22 which forms a frustoconical annular flange extending outwardly from the inner cap 16 at an angle of about 20° to the base 17. The point 23 where the flange 22 begins to extend outwardly from the cap 16 is set back vertically from the edge 18 of the base 17. An annular sealant pocket 24 between the flange 22 and the base 17 is filled with the same polysulphide sealant as the interfay layer 21. The sealant in the sealant pocket 24 bonds the caps 16, 20 to the panel 11 and the sealed main cavity 19 contains any sparking, plasma or out-gassing caused by a lightning strike. The cap may be immersed in fuel, in which case the sealant also prevents the ingress of fuel into the main cavity 19.

Note that the caps are principally bonded together by the domed interfay adhesive layer 21 which is located outside the pocket 24, but they are also bonded together by the sealant within the pocket 24.

Figure 3:
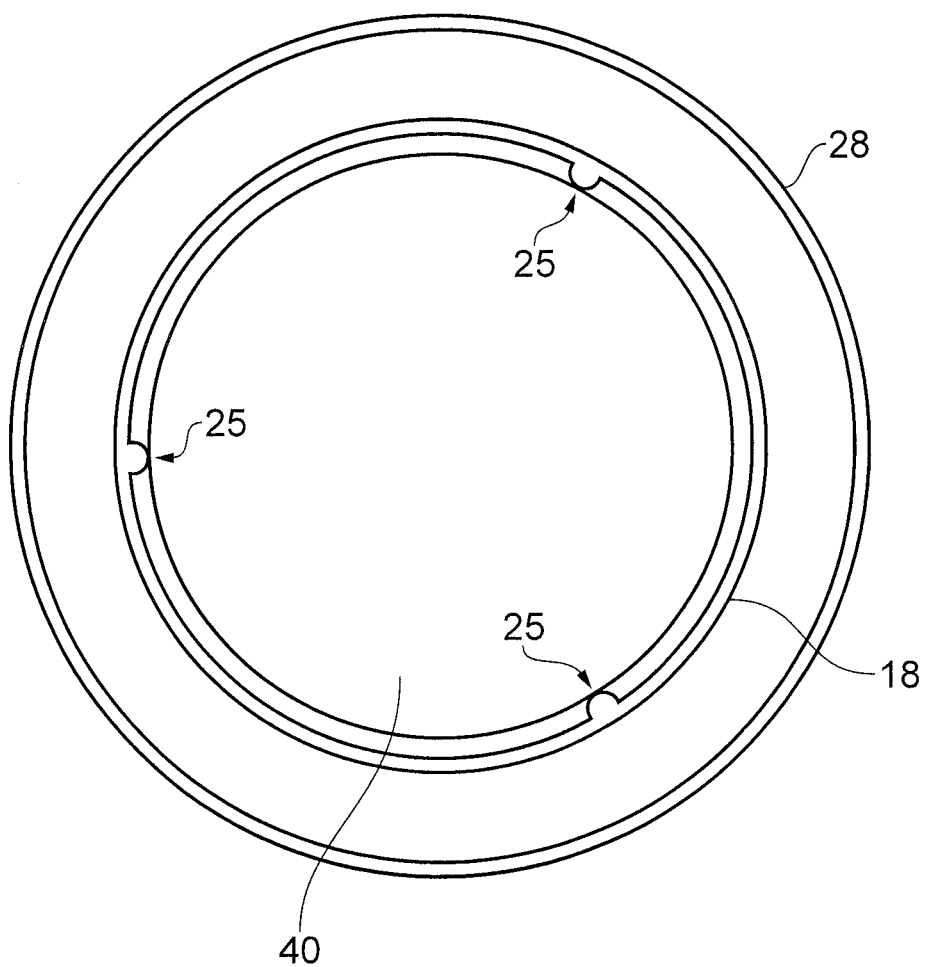
FIG. 3 is a view of the assembly of FIG. 2 taken from below.

The inner cap 16 has three inwardly extending lugs 25 which engage the washer 40 as shown clearly in FIG. 3. The three lugs 25 are spaced equally around the circumference of the washer and allow the inner cap to flex to accommodate expansion around the washer. The inner cap 16 also has a retaining rod 26 to centralise and retain the outer cap 20.

The right hand side of FIG. 2 shows an alternative flange design 22a which is offset vertically by a smaller distance from the edge 18 of the base 17.

Figure 9:
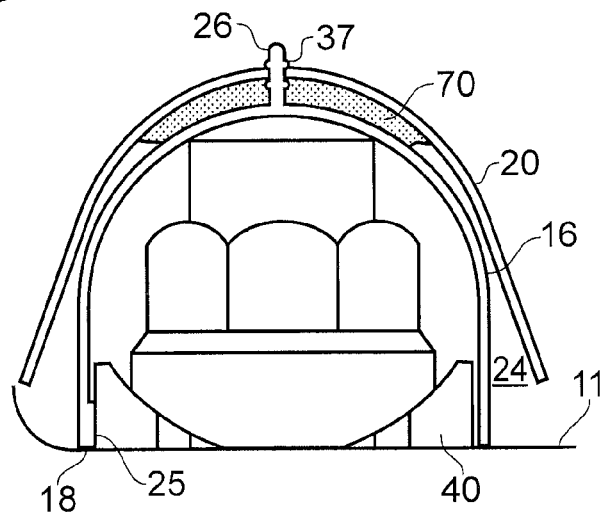
FIGS. 9 and 10 show a method of installing the cap of FIG. 2.
Figure 10:
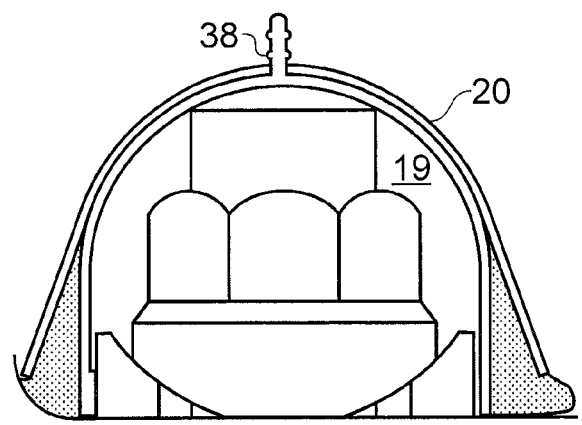

FIGS. 9 and 10 show a method of installing the spark containment cap of FIG. 2. FIG. 9 shows the cap assembly as it is provided for installation, with the outer cap 20 having been pushed past a first annular flange 37 on the retention rod 26 and a metered quantity 70 of polysulphide sealant provided between the inner and outer caps, optionally in a frozen state. The inner cap 16 is pushed onto the fastener assembly with the location lugs 25 engaging the washer 40 as a slight interference fit and the edge 18 of the cap engaging the panel 11. The interference fit prevents the inner cap from falling off under the action of gravity if the panel 11 is downward facing.

Next as shown in FIG. 10 the outer cap 20 is pushed onto the inner cap 16. The polysulphide sealant is squeezed between the outer and inner caps and flows down to the base of the cap, completely filling the pocket 24 without entering the central cavity 19.

As the outer cap is pushed down into the position in FIG. 10 it passes a second annular flange 38 which locks the outer cap into position. The flange 38 enables the cap to be installed on a downwardly facing panel 11 by preventing the outer cap from falling off under the action of gravity before the sealant has cured.

Figure 4:
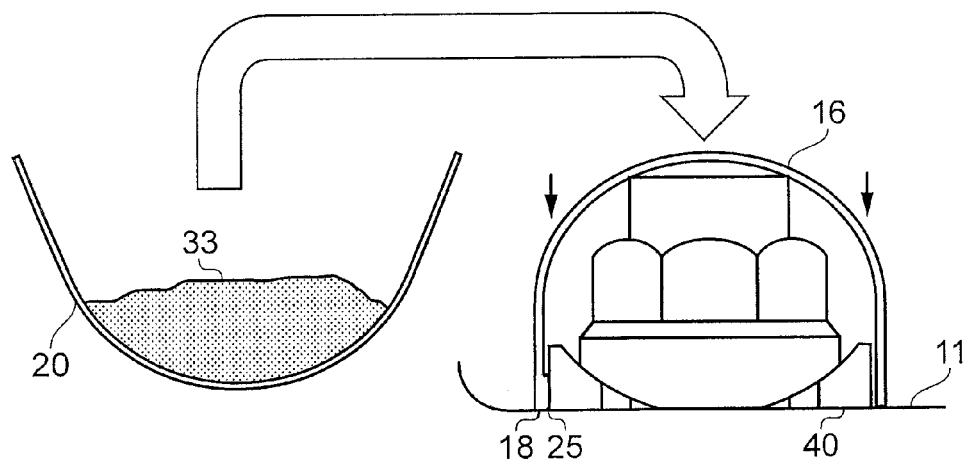
FIGS. 4-6 are sectional side views of a method of installing a spark containment cap according to a second embodiment of the invention.
Figure 5:
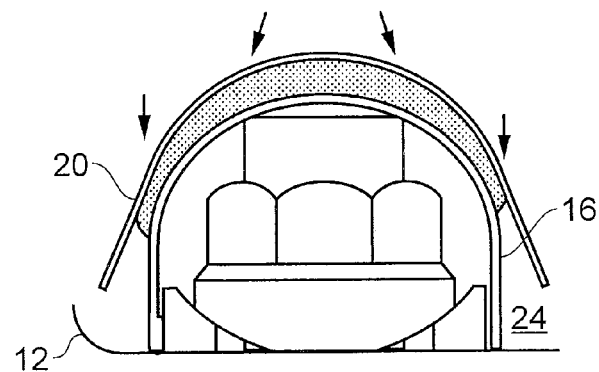
Figure 6:
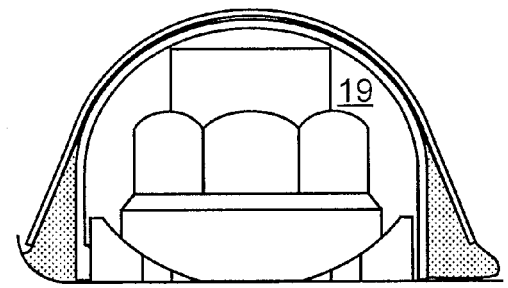

FIGS. 4-6 show a method of installing an alternative spark containment cap which is similar to the cap of FIG. 2 but has no retaining rod 26.

The caps 16, 20 are supplied as a kit of parts. A metered quantity of polysulphide sealant 33 is applied into the outer cap 20. The sealant can be applied to the outer cap 20 during installation, or could be supplied pre-installed in the cap 20 in a frozen state. The inner cap 16 is pushed onto the fastener assembly with the location lugs 25 engaging the washer 40 as a slight interference fit and the edge 18 of the cap engaging the panel 11.

Next as shown in FIG. 5 the outer cap 20 is pushed down onto the inner cap 16. The polysulphide sealant is compressed and flows between the outer and inner caps.

Finally, in FIG. 6 the outer cap is pushed fully down onto the inner cap. This squeezes the sealant and causes it to flow down to the base of the cap filling the pocket 24 without entering the central cavity 19.

Figure 7:
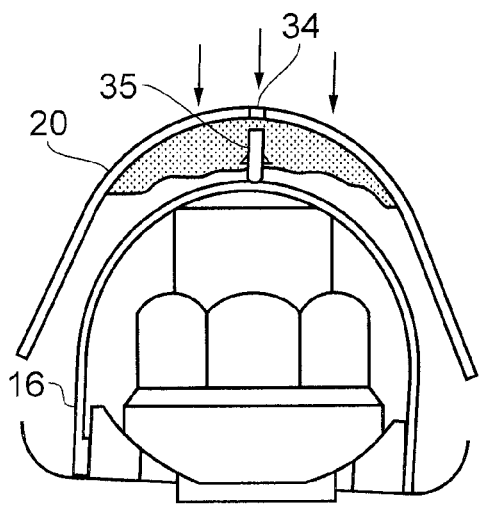
FIGS. 7 and 8 show an alternative spark containment cap with a two-pronged retention feature.
Figure 8:
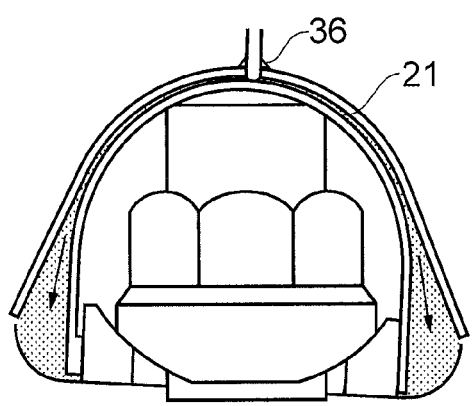

FIGS. 7 and 8 illustrate an installation process for a further alternative cap in which the outer cap 20 has a hole 34 at its apex which receives a split pin 35 extending upwardly from the apex of the inner cap. The split pin 35 is received in the hole 34 and compressed inwardly by a pair of flanges 36. Once the flanges 36 have passed through the hole 34, the arms of the split pin spring back to the position shown in FIG. 8, locking the outer cap 20 in place with a small gap to accommodate the thin interfay adhesive layer 21. In common with the cap of FIG. 2, the cap of FIG. 8 can be installed in an inverted configuration on a downward facing panel 11.

Figure 11:
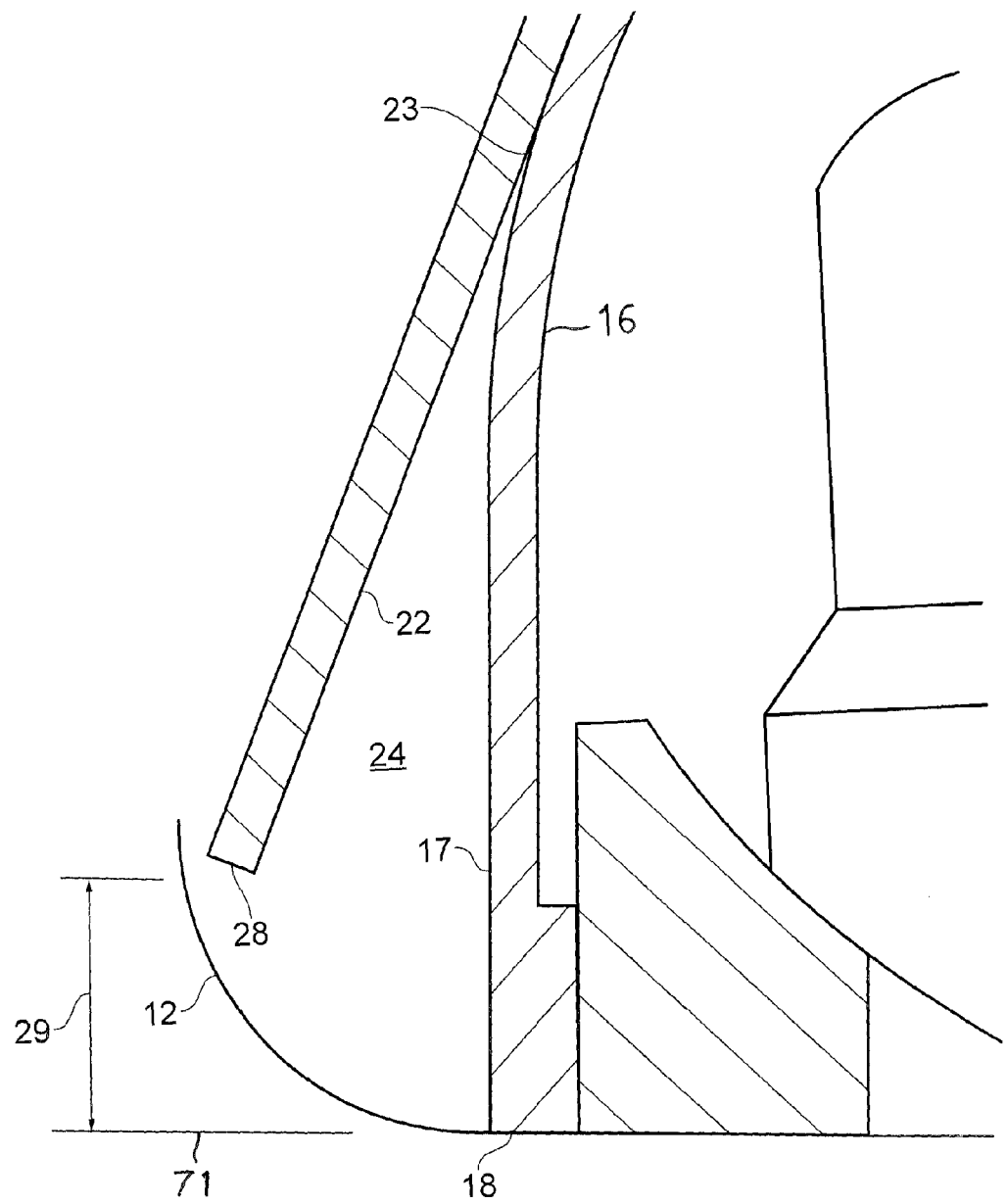
FIG. 11 is an enlarged view of the sealant cavity of the cap of FIG. 2.

FIG. 11 is an enlarged view of the annular sealant pocket 24. As mentioned above, the point 23 where the flange 22 begins to extend outwardly from the cap 16 is set back vertically from the edge 18 of the base 17 by some distance. This provides a relatively large sealant pocket 24 and also enables the cap to accommodate small undulations or features on the surface of the panel. The edge 28 of the flange 22 is also set back from the plane of the edge 18 of the base 17, by a smaller distance 29. This enables the cap to be positioned close to the feature 12.

The sealant pocket 24 increases the adhesion area for the sealant/cap interface. Specifically, the sealant bonds the cap to the composite panel 11 via an adhesive/cap interface with the cap and an adhesive/panel interface with the composite panel. The surface area of the adhesive/cap interface is given by the sum of the areas of the outside of the base 17 and the inside of the flange 22; and the surface area of the adhesive/panel interface is given by the surface area of the feature 12. It can be seen clearly in FIG. 11 that the surface area of the adhesive/cap interface is over 300% of the surface area of the adhesive/composite interface. Line 30 in FIG. 2 shows the footprint for a flat flange extending at 90° to the base 17 with an equivalent surface area. For the flange 22a on the right-hand side of FIG. 2 the ratio is lower, approximately 250%.

Tests demonstrate a mixture of cohesive and adhesive failure modes at the adhesive/composite interface, but no adhesive failure at the adhesive/cap interface due to its large surface area.

FIGS. 12-16 show a cap according to a further embodiment of the invention. The cap has a two-part construction with an outer cap 40 fit onto an inner cap 46 so that the inner cap 46 is nested within the outer cap 40. The caps 46,40 have a curved domed shaped and are formed from a polymer such as polyetherimide ULTEM 2400.

The inner cap 46 has a cylindrical annular base (or skirt) 47 terminating at an edge 48 which surrounds an opening into a central cavity 49 which contains a nut 53 and bolt 50. The upper part of the outer cap 40 has a domed shape and is bonded to the inner cap 46 by a thin polysulphide interfay sealant layer. The interfay sealant layer between the inner and outer caps creates a bonded double layer with enhanced flexibility and strength. A cap axis 67 passes through the apexes of the caps, the centre of the central cavity 49 and the centre of the opening into the central cavity.

The lower part of the outer cap 40 has a flared base (or skirt) 42 which forms a frustoconical annular flange extending outwardly from the inner cap 46 at an angle of about 20° to the base 47. The point 43 where the flange 42 begins to extend outwardly from the cap 46 is set back vertically from the edge 48 of the base 47. An annular sealant pocket 69a, 69b, 69c (labelled in FIG. 14) is provided between the flange 42 and the base 47. The sealant pocket is filled with the same polysulphide sealant as the interfay layer. Note that the interfay sealant layer and the sealant in the annular pocket 69a, 69b, 69c is omitted from FIG. 12-14 for the purpose of clarity. The sealant in the sealant pocket bonds the caps 46, 40 to a panel 51 and the sealed main cavity 49 contains any sparking, plasma or out-gassing caused by a lightning strike. The cap may be immersed in fuel, in which case the sealant also prevents the ingress of fuel into the main cavity 49.

Figure 13:
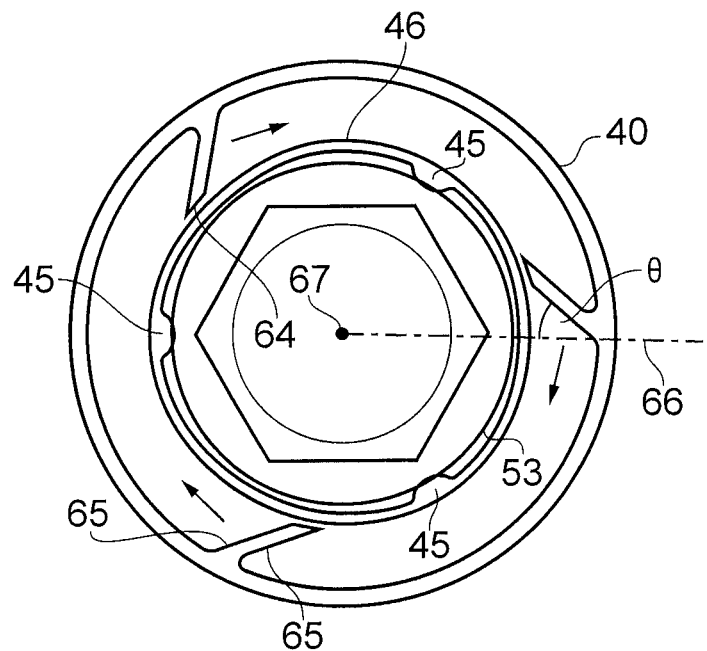
FIG. 13 is a bottom view of the cap of FIG. 12.

The inner cap 46 has three inwardly extending lugs 45 which engage the nut 53 as shown clearly in FIG. 13. The three lugs 45 are spaced equally around the circumference of the washer and allow the inner cap to flex to accommodate expansion around the washer. The inner cap 46 also has a retaining rod 56 to centralise and retain the outer cap 40.

Figure 15:
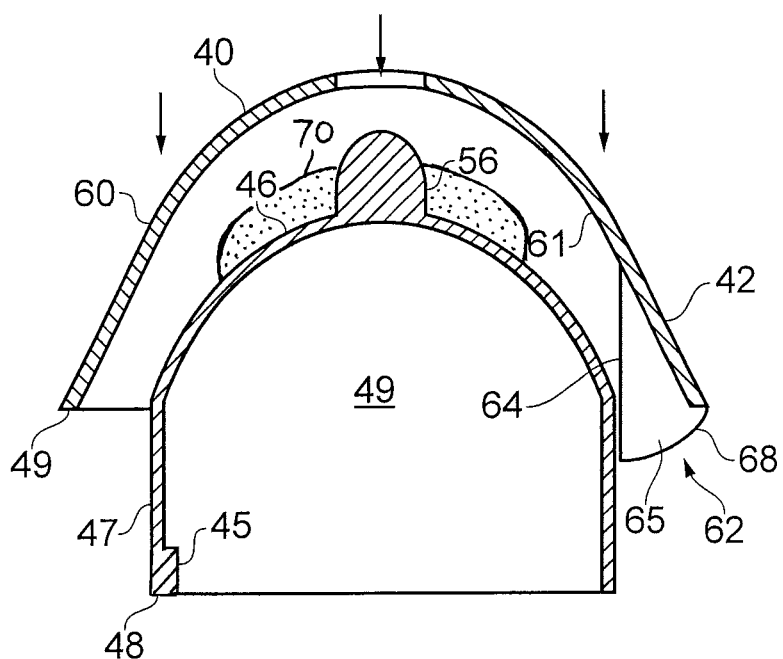
FIG. 15 is a sectional view of the outer cap being pushed onto the inner cap.

The outer cap 40 has an outer surface 60 and an inner surface 61 labelled in FIG. 15. Three vanes or fins 62 extend from the inner surface 61 towards the inner cap 46. Each vane has a base 63 (FIG. 14) where it meets the inner surface 61; an inner edge 64 (FIGS. 13 and 15) adjacent the inner cap 46; a curved convex lower edge 68 (FIG. 15); and a pair of parallel side faces 65 (FIG. 13). The side faces 65 of the vanes are angled so they do not extend radially towards the cap axis 67—rather they extend at an acute angle $\theta$ (FIG. 13) to a radial line 66 between the cap axis 67 and the base 63. Typically the angle $\theta$ is of the order of 30°-60°.

Figure 12:
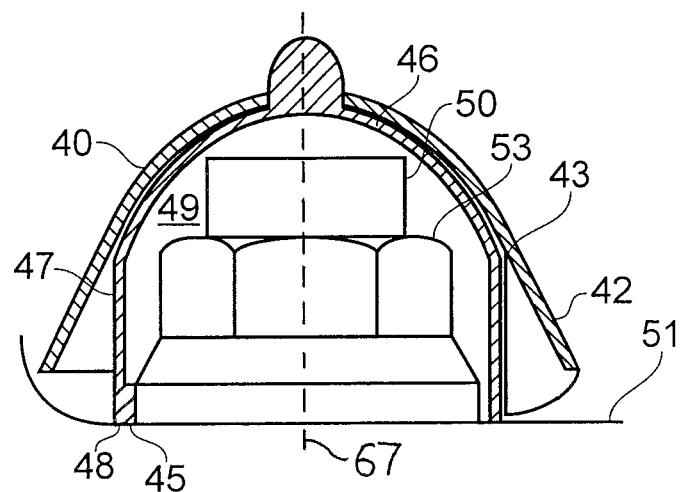
FIG. 12 is a sectional view of a cap according to a further embodiment of the invention.
Figure 14:
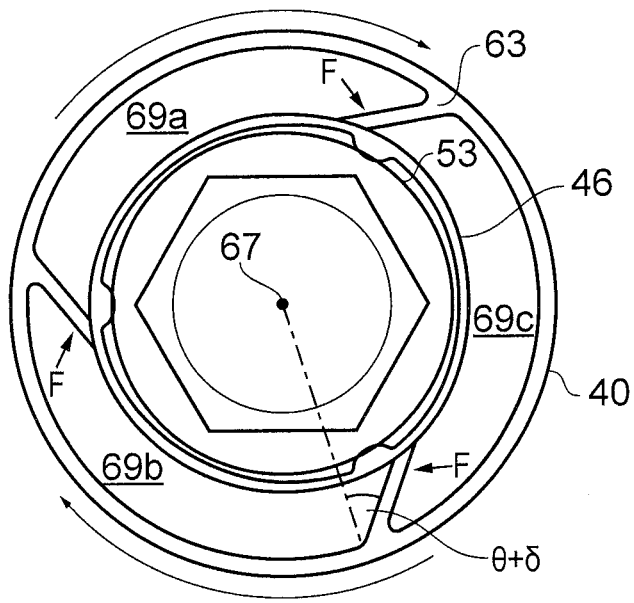
FIG. 14 is a bottom view showing the outer cap being twisted.

FIGS. 13-15 show a method of installing the spark containment cap of FIG. 12.

FIG. 15 shows the cap assembly prior to assembly. A metered quantity of polysulphide sealant 70 is provided between the inner and outer caps, optionally in a frozen state. The sealant 70 is provided on the inner cap in a ring surrounding the retention rod 56 to prevent the rod 56 from pushing sealant up and through the outer cap 40.

The inner cap 46 is pushed onto the fastener assembly with the location lugs 45 engaging the nut 53 as a slight interference fit and the edge 48 of the cap engaging the panel 51. The interference fit prevents the inner cap from falling off under the action of gravity if the panel 51 is downward facing. It also causes the inner cap 46 to adopt a slightly distorted non-circular three-lobed shape as shown in FIG. 13.

The outer cap 40 is then pushed onto the retention rod 56 with the vanes in the orientation shown in FIG. 13. In this orientation the vanes are offset from the lugs 45 so that their tips 64 are offset from the lobes of the inner cap 46 and separated from the inner cap 46 by a gap. The polysulphide sealant is squeezed between the outer and inner caps and flows down to the base of the cap, completely filling the pocket 69a, 69b, 69c without entering the central cavity 49.

The outer cap 40 is then twisted until the tips 64 of the vanes engage the lobes in the inner cap 46. The outer cap 40 is then twisted further until significant resistance is felt, causing the vanes to become aligned with the lugs 45 as shown in FIG. 14. As they do so, the vanes deflect to an angle $\theta+\delta$ and impart an additional inward force F on the inner cap 46 which is then transmitted to the fastener.

The vanes provide a number of advantages:
they help to retain the outer cap 40 on the inner cap 46
they help to retain the inner cap 40 on the nut 53
they help to align the outer cap with the inner cap so their axes are coincident with each other
they divide the annular pocket into three compartments 69a, 69b, 69c which aids the even distribution of sealant flowing into the pocket
they increase the surface area of the sealant/cap interface.

Although the invention has been described above with reference to one or more preferred embodiments, it will be appreciated that various changes or modifications may be made without departing from the scope of the invention as defined in the appended claims.

The invention claimed is:

1. A cap for forming a sealed cavity around one end of a fastener, the cap comprising an inner cap member with an annular base terminating at an edge which surrounds an opening into a central cavity; an outer cap member which fits over the inner cap member and has an annular base which forms an annular flange extending outwardly from the inner cap member at a point which is set back from the edge of the annular base of the inner cap member so as to define a pocket between the flange and the base; and a sealant material between the inner cap member and the outer cap member.

2. The cap of claim 1 wherein the outer cap member has an outer surface; an inner surface; and two or more vanes which extend from the inner surface of the outer cap member towards the inner cap member.

3. The cap of claim 2 wherein the outer cap member defines a cap axis which passes through the centre of the opening, and the vanes are angled so that they do not extend radially towards the cap axis.

4. The cap of claim 1, further comprising a shaft which extends from the inner cap member through the outer cap member.

5. The cap of claim 4 wherein the shaft has one or more flanges which can engage the outer cap member to lock it in position relative to the inner cap member.

6. A joint comprising:
   a. a structure;
   b. a fastener passing through the structure;
   c. a cap comprising:
      i. an inner cap member with an annular base terminating at an edge which surrounds an opening into a central cavity, the inner cap member forming an enclosure around an end of the fastener, and
      ii. an outer cap member which fits over the inner cap member and has an annular base which forms an annular flange extending outwardly from the inner cap member at a point which is set back from the edge of the annular base of the inner cap member so as to define a pocket between the flange and the base; and
   d. a sealant in the pocket between the flange and the base, the sealant bonding the cap to the structure via a sealant/cap interface with the cap and a sealant/structure interface with the structure.

7. The joint of claim 6 further comprising further comprising an adhesive layer which is located outside the pocket and bonds the outer cap member to the inner cap member.

8. The joint of claim 6 wherein the outer cap member has two or more vanes which extend through the pocket towards the inner cap member where they engage the inner cap member.

9. The joint of claim 8 wherein the inner cap member has two or more projections which engage the fastener and force the inner cap member to form a non-circular shape with two or more lobes, each lobe corresponding with a respective one of the projections; and wherein each vane engages a respective one of the two or more lobes.

10. A kit of parts comprising an inner cap member with an annular base terminating at an edge which surrounds an opening into a central cavity; an outer cap member which is sized to fit over the inner cap member and shaped to form an annular flange which extends outwardly from the inner cap member at a point which is set back from the edge of the base when the outer cap member is fit over the inner cap member; and a sealant material contained within the outer cap member.

11. A method of installing a cap to form a sealed cavity around one end of a fastener, the fastener passing through a structure, the cap comprising an inner cap member with an annular base terminating at an edge which surrounds an opening into a central cavity, an outer cap member which fits over the inner cap member and has an annular base which forms an annular flange extending outwardly from the inner cap member at a point which is set back from the edge of the annular base of the inner cap member so as to define a pocket between the flange and the base of the inner cap member, and a sealant material between the inner cap member and the outer cap member, the method comprising:
  a. fitting the inner cap member over the one end of the fastener so that it is enclosed by the inner cap member;
  b. pushing the outer cap member towards the inner cap member so the sealant material flows into the pocket; and
  c. adhering the cap to the structure with the sealant material which flowed into the pocket.

12. The method of claim 11 wherein the outer cap member has an outer surface; an inner surface; and two or more vanes which extend from the inner surface of the outer cap member towards the inner cap member, and the method further comprises engaging the inner cap member with the vanes so that the inner cap member is pushed onto the fastener.

13. The method of claim 12 wherein the inner cap member has a non-circular shape with two or more lobes; the outer cap member is pushed towards the inner cap member during step b. with the vanes not engaging the lobes; and the method further comprises twisting the outer cap member so the vanes engage the lobes and push the inner cap member onto the fastener.

* * * * *